Dec. 17, 1968  R. L. PARRISH ET AL  3,416,581
LOG DEBARKING APPARATUS
Filed May 25, 1966  4 Sheets-Sheet 1
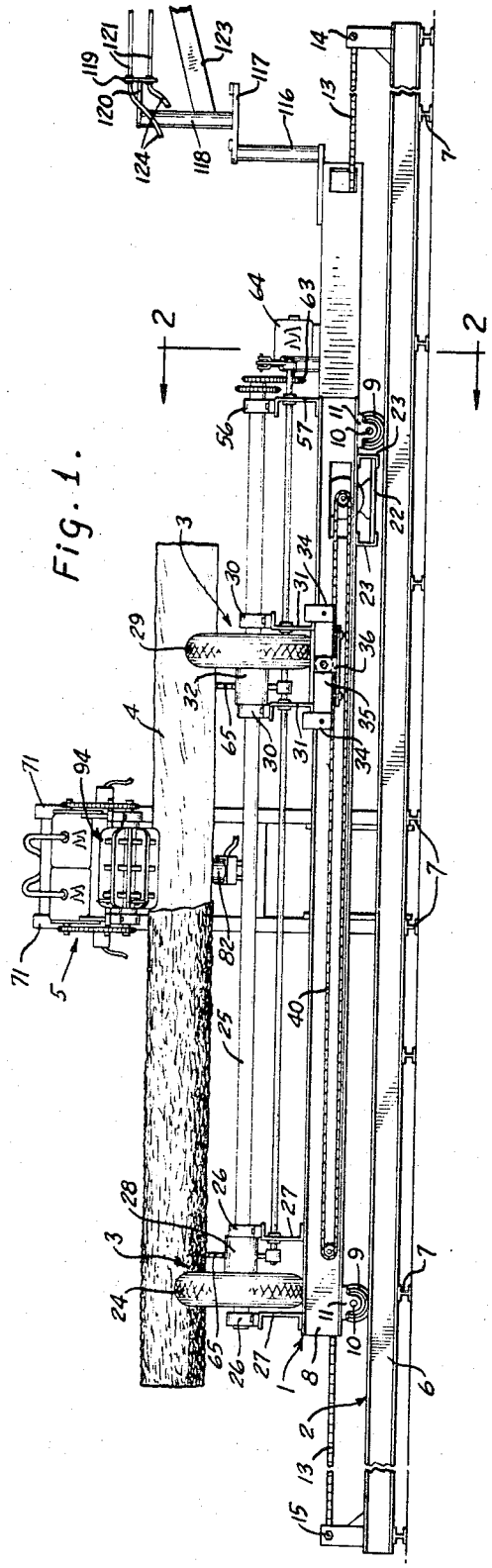
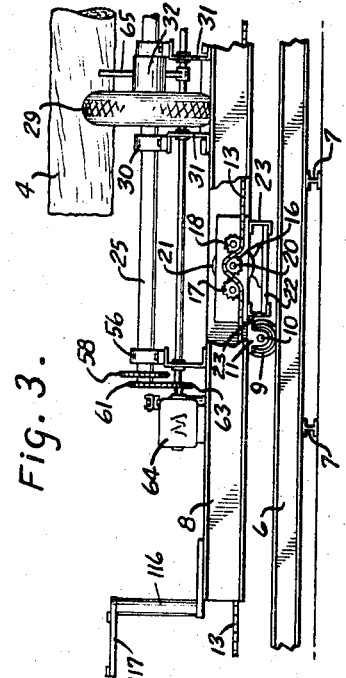
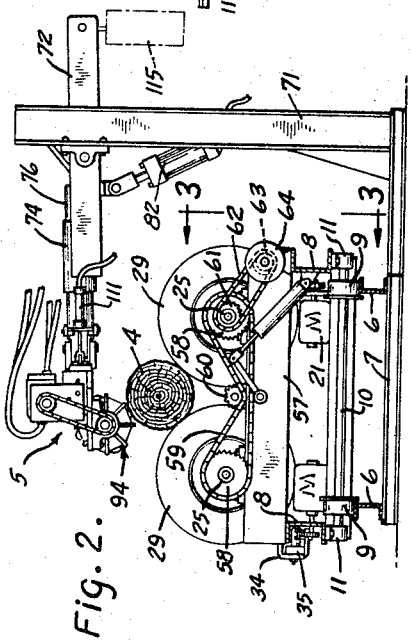
INVENTORS.
RAYMOND L. PARRISH
ARNOLD C. PARRISH
LLOYD A. PARRISH
BY
Andrus & Starke
ATTORNEYS

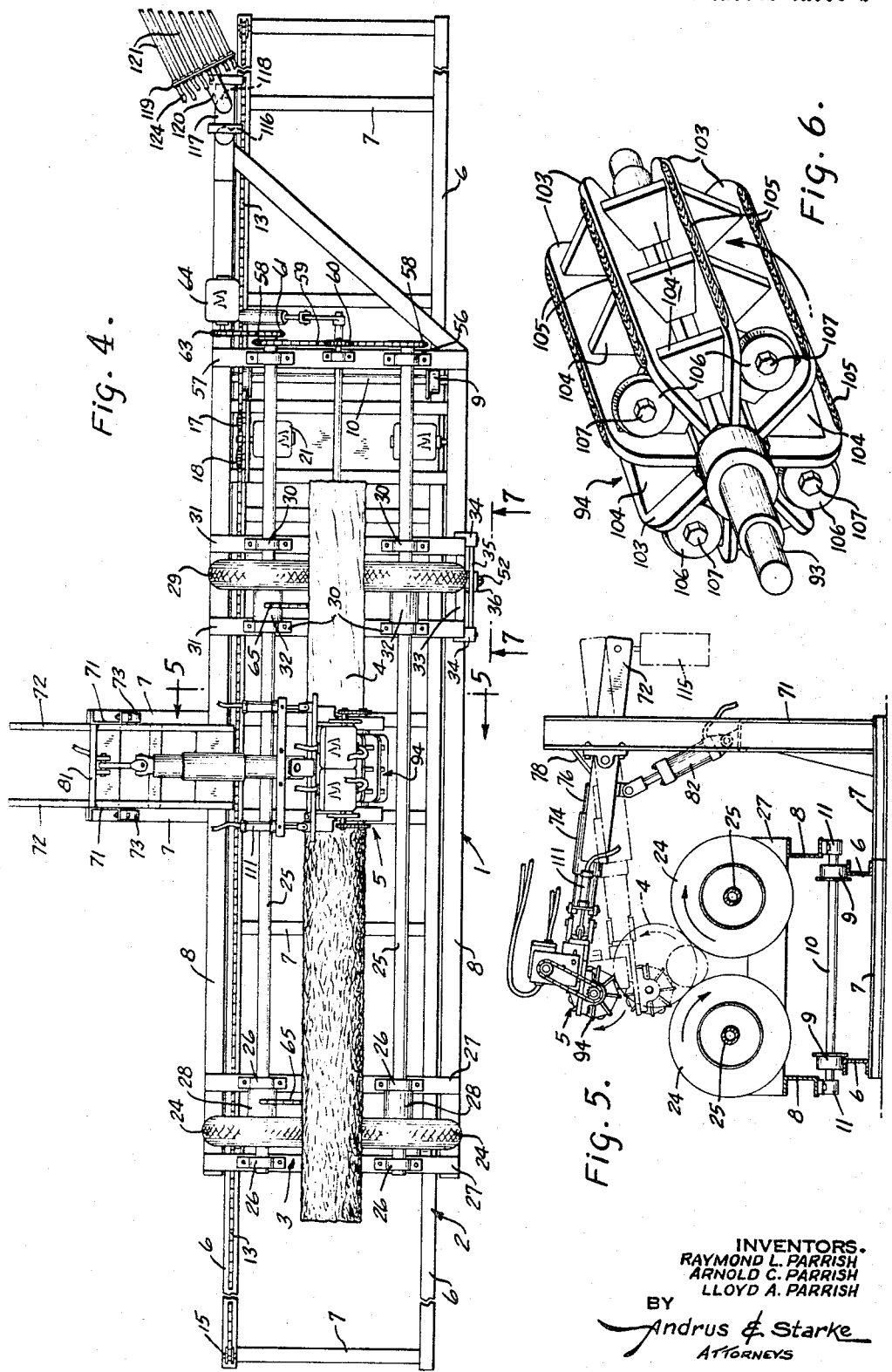

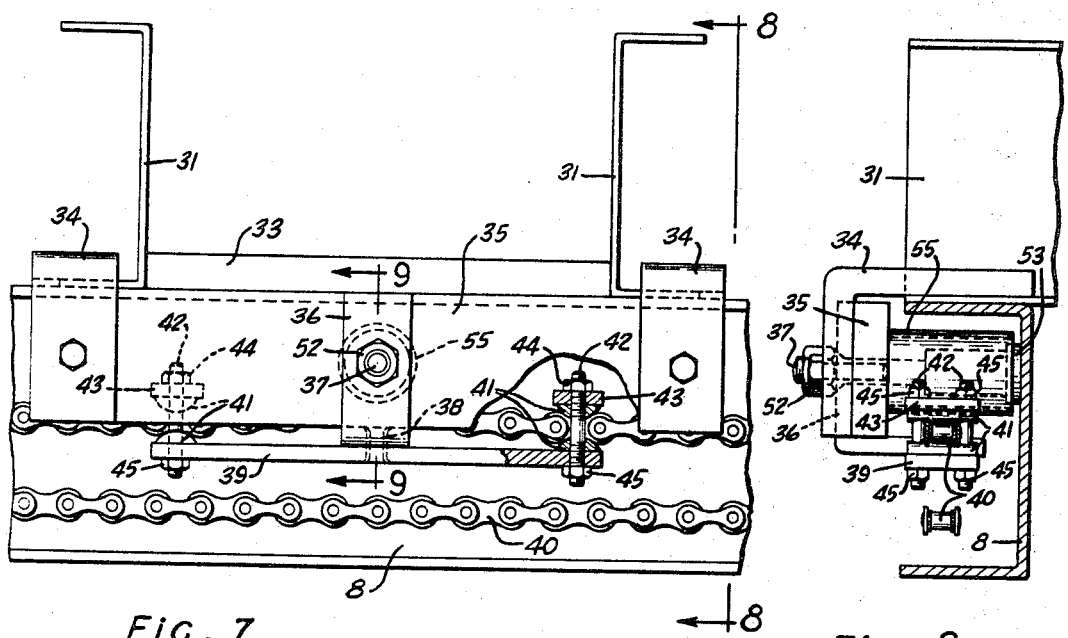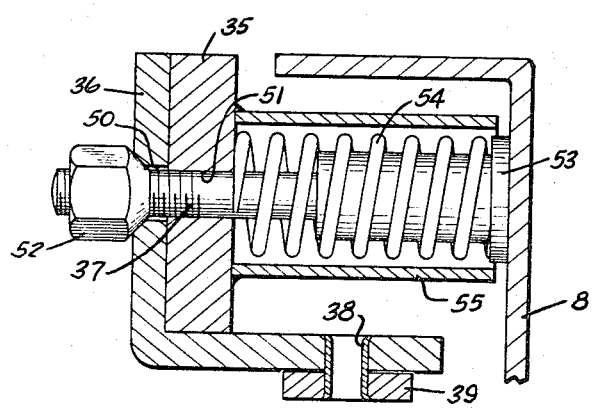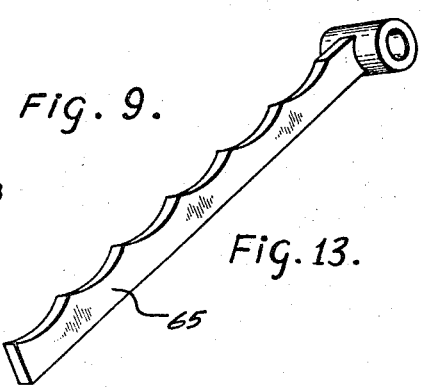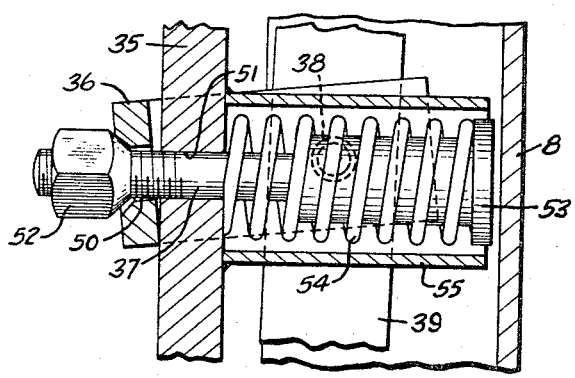

INVENTORS.
RAYMOND L. PARRISH
ARNOLD C. PARRISH
LLOYD A. PARRISH
BY
Andrus & Starke
ATTORNEYS United States Patent Office 3,416,581
Patented Dec. 17, 1968

3,416,581
LOG DEBARKING APPARATUS
Raymond L. Parrish, Stephenson, Arnold C. Parrish, Wells, and Lloyd A. Parrish, Stephenson, Mich., assignors to Lloyd A. Parrish and Esther Parrish, both of Stephenson, Mich.
Filed May 25, 1966, Ser. No. 552,838
23 Claims. (Cl. 144—208)

ABSTRACT OF THE DISCLOSURE

An apparatus for debarking logs, including a carriage which is mounted for movement on a track. Two pairs of driven wheels are mounted on the carriage and the log to be debarked is carried by the wheels and as the wheels rotate, the log is rotated about its axis.

As the carriage moves along the track, a cutting head assembly progressively engages the log and removes the bark. The cutting head assembly includes a cutting head having a series of blades or beaters disposed generally parallel to the axis of the head. As the head rotates, the blades strike the log and serve to remove the bark.

The head is mounted with respect to the head-supporting structure so that the head will maintain the same relative position with respect to a vertical plane passing through the longitudinal center of the log as the head moves in vertical pivotal movement, and this insures that the head will always be slightly over center with respect to the vertical plane passing through the center of the log. By maintaining the head slightly over center, pounding of the head on the log is prevented.

---

This invention relates to an apparatus for debarking logs.

In the processing of logs for sawmill operations or the fabrication of utility poles, it is necessary to initially remove the bark from the logs. It is highly desirable to have a fast and efficient mechanism which removes only the bark without removing or injuring the cambium layer or fibrous material of the log. Difficulties arise in debarking logs due to the irregularity in cross section of the log and due to the fact that the logs are not straight throughout their length but may be considerably bowed or bent. In addition to irregularities in shape, knots and other irregularities in bark condition and hardness are encountered, making it very difficult to uniformly remove the bark from all portions of the log without removing or injuring the fibrous material of the log.

The present invention is directed to an improved mechanism for rapidly debarking logs with a minimum loss of the fibrous material of the log. More specifically, the apparatus includes a carriage which is mounted for movement on a track. Two pairs of driven rubber wheels are mounted on the carriage and the log is carried by the wheels and as the wheels rotate, the log is rotated about its axis.

As the carriage moves along the track, a cutting head assembly progressively engages the log and removes the bark. The cutting head assembly includes a rotating head having a series of blades or beaters which are generally parallel to the axis of the head. As the head rotates, the blades strike the log and serve to pound the bark from the log by an impact type of operation.

A provision is also made for cutting stringy bark, as may be encountered with elm or basswood. A series of knives are mounted on one end of the head adjacent the blades, and as the head rotates, the knives serve to cut the bark to prevent stringing.

The rotating head is mounted on an arm or boom which slides within a sleeve, pivotally connected to a fixed support. A hydraulic cylinder unit is employed to pivot the sleeve and boom with respect to the support to thereby pivot the head in a vertical plane to accommodate different diameter logs. The telescopic or sliding connection between the boom and the sleeve enables the head to maintain the same relative position with respect to a vertical plane passing through the center of the log as the head moves in a vertical pivotal movement and this insures that the head will always be slightly over center with respect to the vertical plane passing through the center of the log. By maintaining the head slightly over center, pounding is prevented.

The debarking apparatus of the invention rapidly and efficiently removes the bark from the logs with a minimum of loss of fibrous material. The machine is capable of being adjusted during its cycle of operation to compensate for irregularities in the shape of the log or in the bark condition. For example, the speed of the feed of the log with respect to the cutting head can be adjusted by the operator to provide the optimum feed for various bark conditions. Moreover, the down pressure of the cutting head on the log can also be adjusted by the operator so that the desired pressure can be maintained on the log regardless of surface irregularities or bark conditions. In addition, the head can be adjusted or pivoted in a horizontal plane and this enables the head to follow any irregularities or bends in the log.

With the debarking machine of the invention, the cutting head is automatically positioned in proper location with respect to the log regardless of the size or diameter of the log. This is brought about by the sliding connection between the boom which carries the head and the pivoting support so that the head will always be slightly over center with respect to the log regardless of the angle of inclination of the head with respect to the horizontal.

The blades or beaters on the cutting head serve to strike the bark and by impact knock the bark from the log. In addition, the series of cutting knives mounted on one end of the head cut the bark transversely to thereby eliminate any problem of stringing as might occur with certain types of wood.

As a further advantage, one of the log supporting wheel assemblies can be moved toward and away from the other wheel assembly to thereby readily accommodate various length of logs.

Other objects and advantages will appear in the course of the following description.

The drawings illustrate the best mode presently contemplated of carrying out the invention.

In the drawings:

FIG. 1 is a side elevation of the debarking apparatus of the invention;

FIG. 2 is an end view taken along line 2—2 of FIG. 1;

FIG. 3 is a fragmentary rear elevation taken along line 3—3 of FIG. 2;

FIG. 4 is a plan view of the debarking apparatus;

FIG. 5 is a transverse section taken along line 5—5 of FIG. 4;

FIG. 6 is a perspective view of the cutting head;

FIG. 7 is an enlarged section taken along line 7—7 of FIG. 4;

FIG. 8 is a transverse section taken along line 8—8 of FIG. 7;

FIG. 9 is a vertical section taken along line 9—9 of FIG. 7 showing the locking mechanism for maintaining the movable wheel assembly in position with respect to the carriage;

FIG. 10 is a horizontal section showing the locking mechanism in the unlocked position;

FIG. 13 is a perspective view of a kicker arm; and

Figure 11:
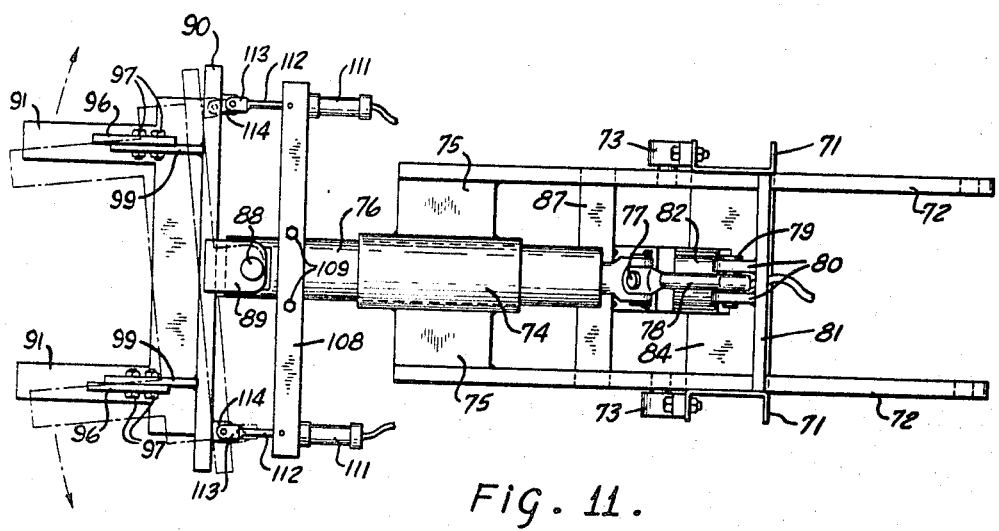
FIG. 11 is a plan view of the cutting head assembly with the cutting head and motor removed.

The drawings illustrate a machine for automatically removing the bark from logs. The machine includes a carriage 1 which is movable along a track 2. Mounted on the carriage are a pair of drive wheel assemblies 3 which support and rotate the log 4 about its axis. As the log is advanced with the carriage, the bark is removed from the log by a cutter head assembly 5.

The track 2 comprises a pair of parallel rails 6 which are supported on beams or ties 7 mounted on the ground or foundation.

The carriage 1 includes a pair of parallel side rails or beams 8 and a pair of bearing blocks 9 are supported from each side rail 8. Journalled within each pair of bearing blocks 9 is an axle 10 which carries wheels 11 that ride on the rails 6. As best shown in FIG. 4, a diagonal beam 12 extends between the side rails 8 at one end of the carriage.

To move the carriage in a reciprocating path on the track 2, a chain 13 extends the length of the carriage and is dead ended on brackets 14 and 15 which are mounted on the ends of the track 2. The chain 3 is engaged with a central drive sprocket 16 and a pair of idler sprockets 17 and 18 which are journalled on a plate 19 supported on the carriage. The shaft 20 of drive sprocket 16 is journalled within an opening in the plate 19 and the inner end of the shaft 20 is connected to a hydraulic motor 21 mounted on platform 22. Platform 22 is supported by cross beams 23 which are secured to the lower edge of the side rails 8 of the carriage. Rotation of the drive shaft 20 serves to drive the sprocket 16, and as the chain 13 is fixed at its end, the rotation of the drive sprocket 16 serves to move the carriage 1 along the track 2.

The log 4 is supported on the wheel assemblies 3 during the debarking operation, and the lefthand wheel assembly 3, as shown in FIG. 1, is fixed with respect to the carriage 1, while the righthand wheel assembly, as shown in FIG. 1, is movable along the carriage to accommodate various lengths of logs. The fixed wheel assembly 3 includes a pair of rubber-tired wheels 24 which are mounted with their axes parallel to the longitudinal dimension of the carriage and the outer surfaces of the wheels 24 are spaced apart, as best shown in FIG. 2. Each of the wheels 24 is carried by a shaft 25, and the shafts 25 are journalled within bearings 26 supported on cross beams 27 which extend between the side rails 8 of the carriage. A spacer sleeve 28 is secured on the shaft 25 between one of the bearings 26 and the wheel 24.

The movable wheel assembly 3 is similar in structure to the fixed wheel assembly and includes a pair of rubber-tired wheels 29 which are mounted for sliding movement on the shafts 25. The wheels 29 are connected to the shafts 25 by a key or spline so that the wheels will rotate with the shafts 25, yet can be moved axially along the shafts when it is desired to adjust the position of the movable wheel assembly 3. The movable wheel assembly 3 also includes a pair of bearings 30 which journal each shaft 25 and the bearings 30 are supported on cross beams 31 which extend across the side rails 8 of the carriage. A spacer sleeve 32 is mounted on each shaft 25 between one of the bearings 30 and the respective wheel 29.

The log 4 is to be supported near its ends by the drive wheel assemblies 3. If a relatively short log is to be debarked, the movable wheel assembly 3 can be moved toward the fixed wheel assembly to thereby shorten the span between the wheel assemblies to accommodate the shorter length log. Conversely, if a longer length log is to be debarked, the movable wheel assembly 3 can be moved in a direction away from the fixed wheel assembly to accommodate the longer length log. As best shown in FIGS. 7 and 8, a plate 33 is secured between the lower ends of the cross beams 31 and the plate is adapted to slide along the upper flange of the side rails 8 as the movable wheel assembly 3 is moved with respect to the carriage 1. The structure for moving the wheel assembly 3 along the carriage 1 includes a pair of generally L-shaped brackets 34 which are secured to the lower flanges of the respective cross beams 31, and a bar 35 is secured by bolts to the vertical flanges of the brackets 34. Mounted centrally on the bar 35 is a generally L-shaped bracket 36 which is connected to the bar by a stud 37 and the lower horizontal flange of the bracket 36 is pivotally connected by a pin 38 to a bar 39. The bar 39 in turn is connected to an endless drive chain 40 by a series of generally semi-cylindrical locking members 41 which are clamped to the links of the chain. As best shown in FIGS. 7 and 8, the locking members 41 are mounted on studs 42 and a connecting bar 43 is mounted on each pair of studs 42. Nuts 44 and 45 engage the upper and lower ends of the studs, respectively, and serve to clamp the locking members 41 into tight engagement with the links of the drive chain 40. With this construction, the movable drive wheel assembly 3 is fixed to the drive chain 40 and will move in accordance with movement of the chain.

As best illustrated in FIG. 1, the endless drive chain 40 is trained about an idler sprocket 46 and a drive sprocket 47 which is mounted on the drive shaft 48 of a hydraulic motor 49 mounted on platform 22. Rotation of the motor drive shaft 48 will move the drive chain 40 and thereby move the movable wheel assembly 3 along the carriage 1.

A provision is made to lock the movable wheel assembly 3 at any desired position along the length of the carriage and this locking mechanism is best shown in FIGS. 9 and 10. The stud 37 extends through an enlarged hole 50 in the bracket 36 and through a hole 51 in the bar 35 and the inner end of the stud is engaged by a nut 52. The outer end of the stud 37 is provided with an enlarged end 53 which engages the inner surface of the side rail 8. A coil spring 54 is positioned around the stud and bears between the bar 35 and the stud end 53 and thereby serves to force the stud 53 toward the side rail so that the frictional contact between the stud end 53 and the side rail 8 serves to lock the movable wheel assembly 3 against movement on the carriage 1. The locking mechanism serves primarily to prevent movement of the wheel assembly 3 due to vibration during the debarking operation, for vibrational movement of the wheel assembly can cause gouging or marring of the upper flange of side rail 8 on which the wheel assembly rides.

The spring 54 is retained in position by a sleeve 55 which is secured to the bar 35 and surrounds the spring.

The locking action provided by the frictional engagement by the stud head 53 which the side rail 8 is automatically released when the movable wheel assembly 3 is moved along the carriage and this releasing action is illustrated in FIG. 10. As shown in FIG. 9, the pivotal connection between the bar 39 and the bracket 36 provided by the pin 38 is off-center with respect to the midpoint of the bracket 36. Thus, when the chain is moved, the bar 39 which is attached to the chain will tend to pivot the bracket 36 in a horizontal plane due to this offset pivotal connection. The pivotal movement of the bracket 36 will move the vertical portion of the bracket away from the bar 35, as shown in FIG. 10, and thereby cause the bracket 36 to wedge the nut 52 inwardly with the result that the end 53 of the stud is moved out of engagement with the side rail 8. This releases the frictional contact between the members so that the wheel assembly 3 can be freely moved along the carriage 1. When the wheel assembly has been moved to its desired position and movement of the chain 40 has ceased, the vertical portion of the bracket 36 will automatically move to a position where it is disposed flatwise against the bar 35, thereby allowing the spring 54 to move the stud 37 outwardly and bring the stud end 53 into frictional engagement with the side rail 8 to thereby lock the wheel assembly to the carriage.

The wheels 24 and 29 are rotated in the direction of the arrows, as shown in FIG. 5, to thereby rotate the log 4 about its axis. To drive the wheels, each shaft 25 is journalled within a bearing 56 supported on cross beam 57 extending across the side rails 8 and the end of each shaft carries a sprocket 58 engaged with an endless chain 59. In addition, an idler sprocket 60 is engaged with the chain 59 and the position of sprocket 60 is adjustable to maintain the proper tension on the drive chain. In addition to the sprocket 58, one of the shafts 25, as best shown in FIG. 2, carries a second sprocket 61 which is connected by drive chain 62 to a sprocket 63 on the drive shaft of a hydraulic motor 64. Operation of the motor drive shaft acts through the chain drive 62 to thereby rotate the righthand shaft 25, as illustrated in FIG. 2, and the rotation of that shaft 25 is transmitted through the chain drive 59 to the other shaft 25 so that the wheels 24 and 29 rotate in the directions shown in FIG. 5.

To remove the log 4 after debarking from the wheel supporting assemblies 3, a pair of kicker arms 65 are connected to a shaft 66 which extends longitudinally of the carriage 1. The shaft 66 is journalled within cross beams 27, 31 and 57 and the outer end of the shaft is secured to a link 67 which is pivotally connected to piston rod 68 of hydraulic cylinder 69. During the debarking operation, the kicker arms 65 are in a generally horizontal position beneath the log 4. After the debarking, when it is desired to remove the log from the wheel support assemblies 3, the hydraulic cylinder 69 is actuated to thereby pivot the kicker arms 65 upwardly into engagement with the log to thereby move the log laterally over the wheels where it will be deposited on a suitable conveyor for conveying to the sawmill, or the like. With this construction, the kicker arms can kick the log laterally in either direction from the carriage, depending on which side of the unit the cutter head assembly 5 is mounted.

As best shown in FIG. 13, the upper surface of the kicker arm, which is to engage the log, is provided with a series of notches or scallops 70 and the notches serve to increase the frictional contact between the kicker arm and the log to thereby aid in moving the log laterally over the wheels at the end of the debarking operation.

Figure 12:
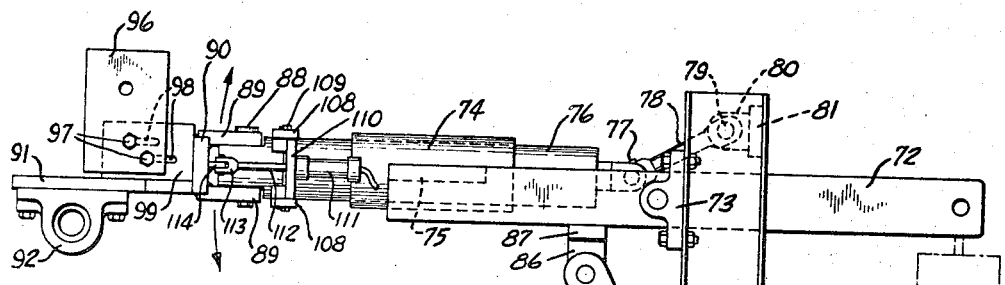
FIG. 12 is a side elevation of the structure shown in FIG. 11.
Figure 14:
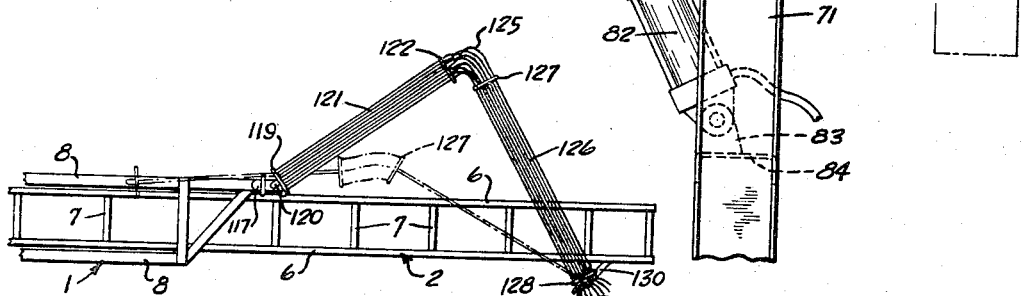
FIG. 14 is a diagrammatic plan view showing the connections of the hydraulic lines to the carriage.

The cutter head assembly 5, which serves to remove the bark from the rotating log, is best illustrated in FIGS. 11 and 12. The assembly includes a pair of channels or columns 71 which extend upwardly from the ground and a pair of arms 72 are pivotally connected to the upper end of the column 71 by trunnions 73. A tubular member or sleeve 74 is located between the arms 72 and is connected to the respective arms by crossplates 75.

A generally cylindrical boom 76 is mounted for sliding movement within the sleeve 74 and the inner end of the boom is connected by a universal joint 77 to the outer end of a link 78, while the inner end of the link is pivotally connected by pin 79 to a pair of lugs 80 on cross bar 81 which extends between the columns 71.

To pivot the arms with respect to the column 71, the lower end of a hydraulic cylinder 82 is pivotally connected to lugs 83 which extend upwardly from cross beam 84 extending between the columns 71. A piston rod 85 is slidably mounted within a cylinder 82 and the outer end of the rod is pivotally connected to a bracket 86 which extends downwardly from a cross bar 87 connecting the arms 71. As the piston rod 85 is extended, the arms 72 are pivoted upwardly with respect to the columns 71 and the boom will slide outwardly away from the columns 71 with respect to the sleeve 74. This construction permits the cutting head to maintain the same relative position with respect to the wheels 24 and 29 and to the log, as will be described more fully later.

The outer end of the boom 76 is pivotally connected by pin 88 to a pair of plates 89 and the forward edges of plates 89 are welded to a vertical bar 90. A generally C-shaped support plate 91 is secured to the lower edge portion of the bar 90, and a bearing block 92 is mounted on the undersurface of each leg of the C-shaped support plate 91. The bearings 92 serve to journal the ends of a shaft 93 which carries the cutting head 94.

To rotate the cutting head 94, a pair of hydraulic motors 95 are mounted on vertical support plates 96, and plates 96 are adjustably connected through bolts 97 and slots 98 to plates 99 which extend upwardly from the support plate 91. The drive shaft 100 of each hydraulic motor 95 is connected by a drive chain 101 to a sprocket 102 located on each end of the cutter head shaft 93. Thus, both of the motors 95 are connected to the drive shaft 93 and serve to rotate the cutter head 94.

The cutter head is best illustrated in FIG. 6 and includes a series of blades 103 which extend radially outward from the shaft 93. Webs 104 are welded edgewise between adjacent blades 103, and a weld bead 105 of a hard, wear-resistant alloy is deposited on the leading edge of each of the plates 103 or blades. The blades or beaters 103 do not have sharpened edges, but the weld beads provide rough projecting edges which increase the wear resistance of the blades. The blades 103 do not remove the bark by a cutting action but instead remove the bark by an impact or beating action.

In some cases, the bark may be rather stringy, as in the case of elm or basswood. In this case, it is desirable to include a series of generally circular knives 106 which are secured by bolts 107 to the webs 104. As the head rotates, the knives 106 will tend to cut the bark so that it can be more readily knocked off of the log by the rotating beaters or blades 103. The knives 106 are not intended to rotate about their axes but are fixed with respect to the head. The connection provided by the bolts 107 permits the knives to be rotated and adjusted for wear, so that a new and sharp knife edge can be presented by merely unloosening the bolt 107 and rotating the knife 106 to a new position.

A provision is also made to pivot the head in a horizontal plane. In this regard, a pair of cross bars 108 are connected by bolts 109 to the outer portion of the boom 76. A vertical plate 110 is positioned between the cross bars 108, and plates 110 carry hydraulic cylinders 111. The piston rod 112 of each cylinder extends through the plate 110 and the outer end of each rod is provided with a yoke 113 which is pivotally connected to a lug 114 on the cross bar 90. As previously mentioned, the cross bar 90 and supporting plate 91 are pivotally connected to the outer end of the boom 76 through the vertical pin 88 and by extending one of the piston rods 112 while withdrawing the other, the support plate 91, as well as the head 94, can be pivoted in a horizontal plane with respect to the boom 76. This pivotal movement enables the operator to follow bends or irregularities in the log so that the axis of the head 94 can be maintained generally parallel to the axis of the log at all times.

In addition to pivoting in a horizontal plane, the head 94 is free to pivot in a vertical plane and this aids in completely removing the bark from longitudinal grooves or deformities in the log. To provide this free vertical pivotal movement, boom 76 is mounted for free rotation within the sleeve 74 and the outer end of the boom is connected by the universal joint 77 to the fixed support. Thus, head 94 can freely pivot around the axis of boom 76 to enable the head to conform to irregularities in bark condition.

The hydraulic cylinder 82 serves to pivot the arms 72 and the head 94 in a vertical plane and enables the head to be moved upwardly out of the way when a log 4 is positioned on the drive wheel assemblies 3 and to move the head downwardly into engagement with the log after it has been positioned. In addition, the hydraulic pressure acting within the cylinder 82 provides a down pressure to urge the head 94 downwardly into engagement with the log and thereby enables the head to follow irregularities in the contour of the log. As best shown in FIGS. 2 and 5, the head 94 is over center with respect to the log 4 when it is in the debarking position. More specifically, a vertical plane passing through the axis of the head 94 is offset or located beyond a vertical plane passing through the center of the log so that the head will not be acting directly on the upper extremity of the log. If the head rotates in contact with the upper extremity of the log, directly in line with the axis of the log, a pounding action is produced which may result in the removal of fiber material from the log.

The telescopic connection of the boom 76 to the arm 72 enables the head 94 to assume the desired over-center position at all times. As previously mentioned, as the arms 72 are pivoted upwardly, the boom 76 will slide outwardly with respect to the sleeve 74 to thereby maintain the head 94 in this over-center position regardless of the horizontal attitude of the arms 72. The head 94 is counter balanced by a weight 115 attached to the rear ends of the arms 72.

The rubber tires on wheels 24 and 29, which support the log being debarked, substantially reduce the vibration and noise, thereby resulting in a more efficient, quieter operation.

The speed of rotation of the log can also be readily varied by the operator to achieve the optimum speed of rotation for each log, depending on the type of wood, the bark thickness and condition, the season of the year and other factors.

To supply hydraulic fluid to the various motors and cylinders mounted on the movable carriage 1, an extendible hydraulic system is employed. As best shown in FIGS. 1 and 4, a column 116 is mounted on the end of carriage 1 and plate 117 is pivotally connected to the upper end of column 116. Mounted on plate 117 is a post 118 and a vertical support plate 119 is connected to post 118 through bracket 120. A series of tubes 121 adapted to conduct hydraulic fluid are secured within openings in plate 119, and a similar plate 122 supports the opposite ends of tubes 121. As the tubes 121 have a substantial length and are supported only at one end from post 118, a diagonal brace 123 is connected as a reinforcement between the post 118 and the central portion of the bank of tubes 121. With this construction, the entire bank of tubes 121 can swing or pivot in a horizontal plane about the axis of column 116.

The ends of tubes 121 are connected by hoses 124 to the various hydraulic drive members mounted on carriage 1, while the opposite ends of the tubes 121 are connected by short hoses 125 to a similar bank of tubes 126 supported within plates 127 and 128. As in the case of tube bank 121, the tube bank 126 is mounted on a vertical post 129 pivotally connected to a column 130, similar to column 116, which is secured to the track 2. The tubes 126 are connected to a suitable source of hydraulic fluid through hoses 131.

The bank of tubes 126 can pivot or swing around the axis of column 130 in the same manner that tube bank 121 swings around column 116 and as the carriage moves along the track, the tube banks 121 and 126 will move relative to each other. For example, during the carriage movement, the tube banks 121 and 126 can move from a completely jack-knived position in which the column 116 on carriage 1 is adjacent the column 130, to an extended position in which the tube banks are almost in a straight-line relation and the column 116 on carriage 1 is a substantial distance from the column 130 on track 2. This construction provides a continuous hydraulic connection between the fixed and movable elements without using long flexible hoses which might wind around or tangle with the equipment.

In operation, the logs to be debarked are normally brought to the debarking machine on a conveyor. The operator will adjust the movable wheel assembly 3 to the desired position, depending on the length of the log to be debarked. After the wheel assembly 3 is properly positioned, the log is fed onto the wheels 24 and 29 and the wheels are rotated to thereby rotate the log about its axis. The carriage 1 is then moved along the track 2 and as the leading end of the log approaches the cutting head assembly 5, the operator will lower the arms 72 to bring the head 94 down into contact with the log. The bark chips which are removed by the cutting head will fly laterally and can either be collected in a bin or a truck.

As the log 4 is advanced with respect to the cutting head 94, the operator can adjust or regulate the speed of advancement of the log as well as the down pressure on the cutter head to remove all portions of the bark, regardless of the contour of the log or bark conditions.

After the log has advanced past the cutter head so that the bark has been removed from the entire log, the kicker arms 65 are pivoted upwardly to thereby move the log laterally over the wheels 24 and onto a stock pile or conveyor system.

The present invention provides an apparatus for rapidly and efficiently removing the bark from logs. The rotating cutting head is automatically positioned in an over-center relation with respect to the log regardless of the diameter of the log which is being debarked.

The machine is capable of being adjusted during the cycle of operation to compensate for irregularities in the shape of the log and the bark conditions. More specifically, the speed of advancement of the log can be adjusted, as well as the down pressure of the head on the log. Moreover, the head can be pivoted in a horizontal plane to maintain the axis of the head in generally parallel alignment with the axis of the log. In addition, the head is free to pivot in a vertical plane to follow irregularities in the bark.

The cutting head has a provision for cutting stringy bark consisting of a series of generally circular knives 106 which are connected to the webs 104 between the beaters or blades 103. The knives 106 cut the bark and prevent the bark from being pulled in long lengths from the log.

The log is supported adjacent its ends on two pairs of rubber-tired wheels and the two-position support has advantages over a system in which the log is supported at numerous locations along its length. In this latter situation, if a bowed log is being debarked and the bow is at the location of one of the supports, the head, when engaging the bowed portion, is apt to kick the log from the supports as it is being debarked. However, when the support is at the two ends, this situation will not occur. Moreover, one of the wheel supporting members is movable along the length of the carriage so that various lengths of logs can be readily accommodated. The movable wheel support can be readily locked to the carriage and the locking mechanism is automatically released when the movable support is moved.

As the cutting head 94 is stationary with respect to the carriage, the chips of bark will all be thrown into one location so that they can be collected into a bin or truck. This is a substantial advantage over a machine in which the head moves along the log, for in this latter case, the chips would be discharged along the entire length of travel of the head.

As a further advantage, the rubber tires on wheels 24 and 29 substantially reduce vibration, chatter and noise, thereby resulting in a more efficient and quieter operation.

We claim:

1. An apparatus for debarking logs, comprising a track, a carriage mounted for movement on the track, means for moving the carriage on said track, log-supporting means mounted on the carriage for supporting a log, a bark removing head disposed to engage the log as the log is advanced with the carriage to remove the bark from said log, head supporting means extending transversely of the carriage for supporting said head, the center of said head being offset laterally from a vertical plane passing longitudinally through the center of the log supported on said log-supporting means whereby said head contacts a portion of the log spaced from the upper periphery of said log, means for pivoting the head support means in a generally vertical plane to move the head with respect to said log-supporting means, and means responsive to pivotal movement of the head with respect to said log-supporting means for simultaneously moving the head with respect to the head support means to thereby position said head at said offset relation to said log at varying positions of said head support means.

2. The debarking apparatus of claim 1 and including means for pivoting the head in a generally horizontal plane with respect to said head support means.

3. The apparatus of claim 1, and including means for pivoting the head about a generally horizontal axis.

4. The debarking apparatus of claim 1 in which the head supporting means includes a boom with one end of said boom carrying the head, said head support means also including a supporting column and a frame pivotally connected to the column for movement in a vertical plane, said boom being slidably mounted for axial movement with respect to said frame whereby said boom moves outwardly toward said carriage as the frame is pivoted upwardly to thereby maintain the offset relationship of said head to said log at varying pivotal attitudes of the frame.

5. The apparatus of claim 4, in which the boom is mounted for rotation about its axis with respect to the frame to thereby permit the head to pivot about the axis of the boom.

6. The debarking apparatus of claim 4 in which the head is mounted for rotation about an axis generally parallel to the direction of movement of said carriage, and said head includes a hydraulic motor carried by the boom and operably connected to said head to rotate the same about said axis.

7. The debarking apparatus of claim 4 in which the head includes a shaft extending generally parallel to the direction of movement of the carriage and said head includes a series of generally parallel log-engaging elements disposed parallel to said shaft, and means for rotating said shaft to thereby rotate said elements into contact with the bark on the log to debark the same.

8. In an apparatus for debarking logs, log supporting means for supporting the log and rotating the log about its axis, means for moving the log supporting means in a path of travel, a bark removing head disposed to engage the log as the log is moved with the log supporting means to remove the bark from the log, head supporting means extending transversely of the direction of movement of the log supporting means for supporting said head, means for pivoting said head supporting means in a substantially vertical plane, means for pivoting said head with respect to said head supporting means in a generally horizontal plane, and means for pivoting the head with respect to the head supporting means about a generally horizontal axis.

9. The apparatus of claim 5 in which the opposite end of said boom is connected by a universal joint to a fixed support, said universal joint permitting said boom to rotate with respect to said frame.

10. In a log debarking apparatus, a bark removing head disposed to engage a log and remove the bark from said log, said head including a rotatable shaft, a series of elements connected to said shaft with said elements being arranged generally parallel to the axis of said shaft, and cutting means located adjacent one end of the head and disposed transversely of the axis of said shaft for cutting the bark prior to engagement of the elements with said bark.

11. The structure of claim 10 in which the elements are connected by webs.

12. The structure of claim 10 in which a wear resistant metal bead is applied to the leading edge of each of said log engaging elements.

13. The structure of claim 10 in which said cutting means constitutes a series of blades located between adjacent elements.

14. The structure of claim 13 in which said blades are generally circular knives adjustably mounted on said head to be rotatable to compensate for wear.

15. The structure of claim 1, and including log removing means pivotally connected to the carriage for engaging the log and moving the log transversely from the log supporting means at the completion of the debarking operation.

16. The structure of claim 15 in which the log removing means includes a kicker arm having a notched surface disposed to engage the log.

17. The structure of claim 8, in which the log supporting means includes two pair of cooperating rotatable wheels and said wheels are provided with rubber tires, said log being supported on said tires and being rotated in accordance with rotation of said wheels.

18. An apparatus for debarking logs, comprising a track, a carriage mounted for movement on the track, means for moving the carriage on said track, first log supporting means mounted on said carriage for supporting and rotating a log about its axis, second log supporting means mounted on said carriage for supporting and rotating the log, said second log supporting means being spaced from said first log supporting means and being movable along said carriage, drive means for moving said second log supporting means along said carriage, locking means for locking said second log supporting means at positions along the length of the carriage, means responsive to operation of said drive means for automatically releasing said locking means, and bark removing means disposed to engage the log as the log is advanced with the carriage to remove the bark from the log.

19. The apparatus of claim 18, and including means responsive to stopping the operation of the drive means for automatically engaging said locking means.

20. The apparatus of claim 19 in which said locking means comprises a locking member disposed to frictionally engage a longitudinally extending surface of the carriage and said locking means includes resilient means for urging the locking member into frictional engagement with said surface.

21. The apparatus of claim 20, in which said drive means is an endless chain and initial movement of said chain acts to release the force of said resilient means to thereby enable the drive chain to move said second log supporting means along the carriage.

22. An apparatus for debarking logs, comprising track, a carriage mounted for movement on the track, means for moving the carriage on said track, log supporting means mounted on the carriage for supporting and rotating a log about its axis, hydraulic drive means mounted on the carriage and operably connected to said log supporting means for driving the same, a first rigid conduit pivotally connected to said carriage and having one end connected to said hydraulic drive means, a second rigid conduit pivotally connected to a fixed support and having one end communicating with a source of hydraulic fluid, a relatively short length of flexible tubing connecting the opposite end of said first rigid conduit to the opposite end of the second rigid conduit, and back removing means disposed to engage the rotating log as the log is advanced with the carriage to remove the bark from the log.

23. The apparatus of claim 22, in which the first and second conduits have substantially the same length and are mounted to pivot in a generally horizontal plane, said conduits being arranged to pivot from a jack-knived position to a substantially straight-line position during movement of the carriage.

(References on following page)

References Cited

UNITED STATES PATENTS

| | | | |
|---|---|---|---|
| 2,505,168 | 4/1950 | Augustin | 144—208.6 XR |
| 2,671,480 | 3/1954 | Efurd et al. | 144—208.6 |
| 2,765,011 | 10/1956 | Jackson | 144—208.6 |
| 2,901,011 | 8/1959 | Eaton | 144—208.9 |
| 2,950,743 | 8/1960 | Napier et al. | 144—208.6 |
| 3,351,109 | 11/1967 | Schurman | 144—210 |

FRANCIS S. HUSAR, *Primary Examiner.*

U.S. Cl. X.R.

144—218